H. P. & A. S. MACDONALD.
BOOK STACK.
APPLICATION FILED APR. 28, 1913.
1,251,072.
Patented Dec. 25, 1917.
7 SHEETS—SHEET 1.
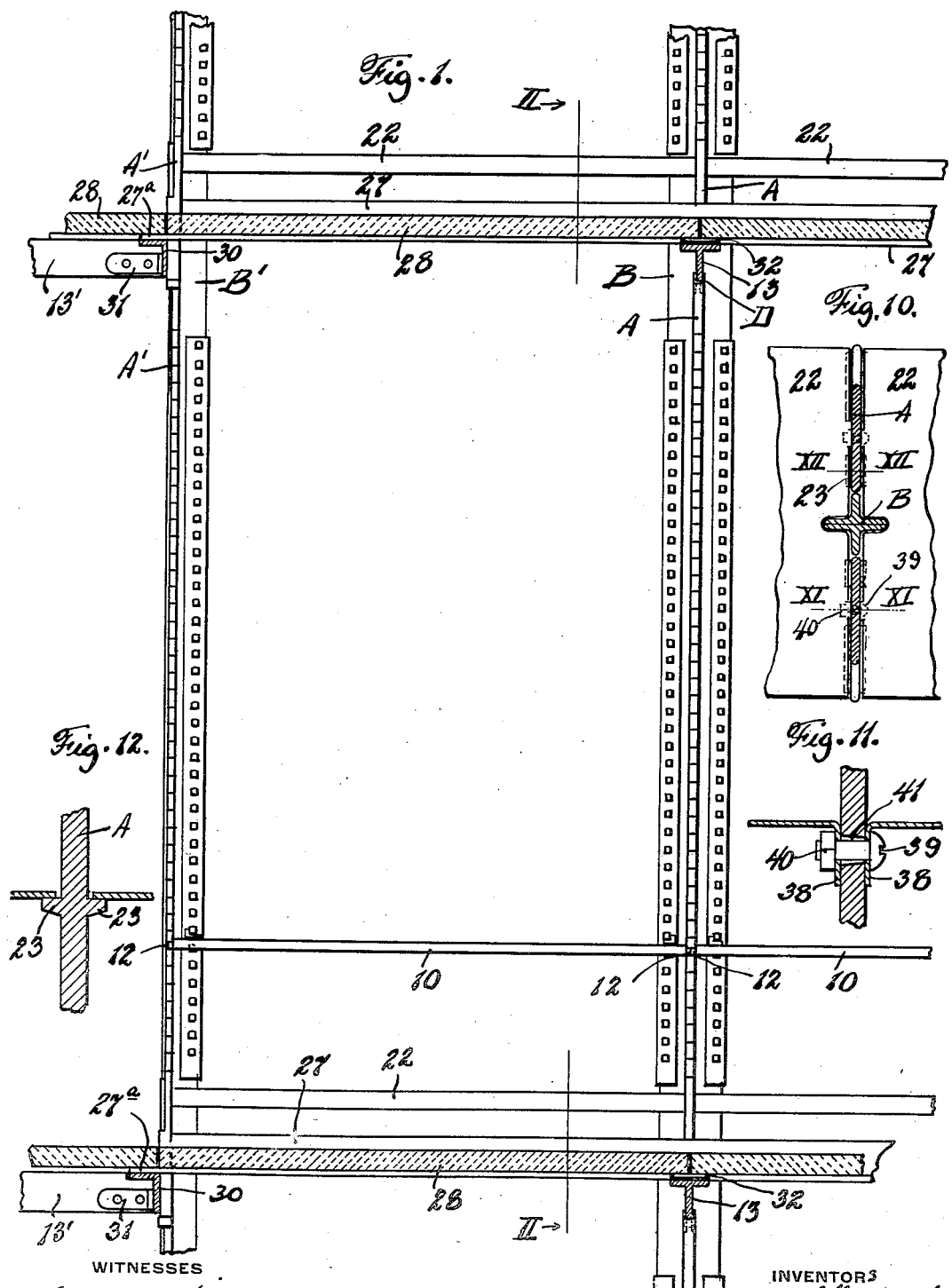

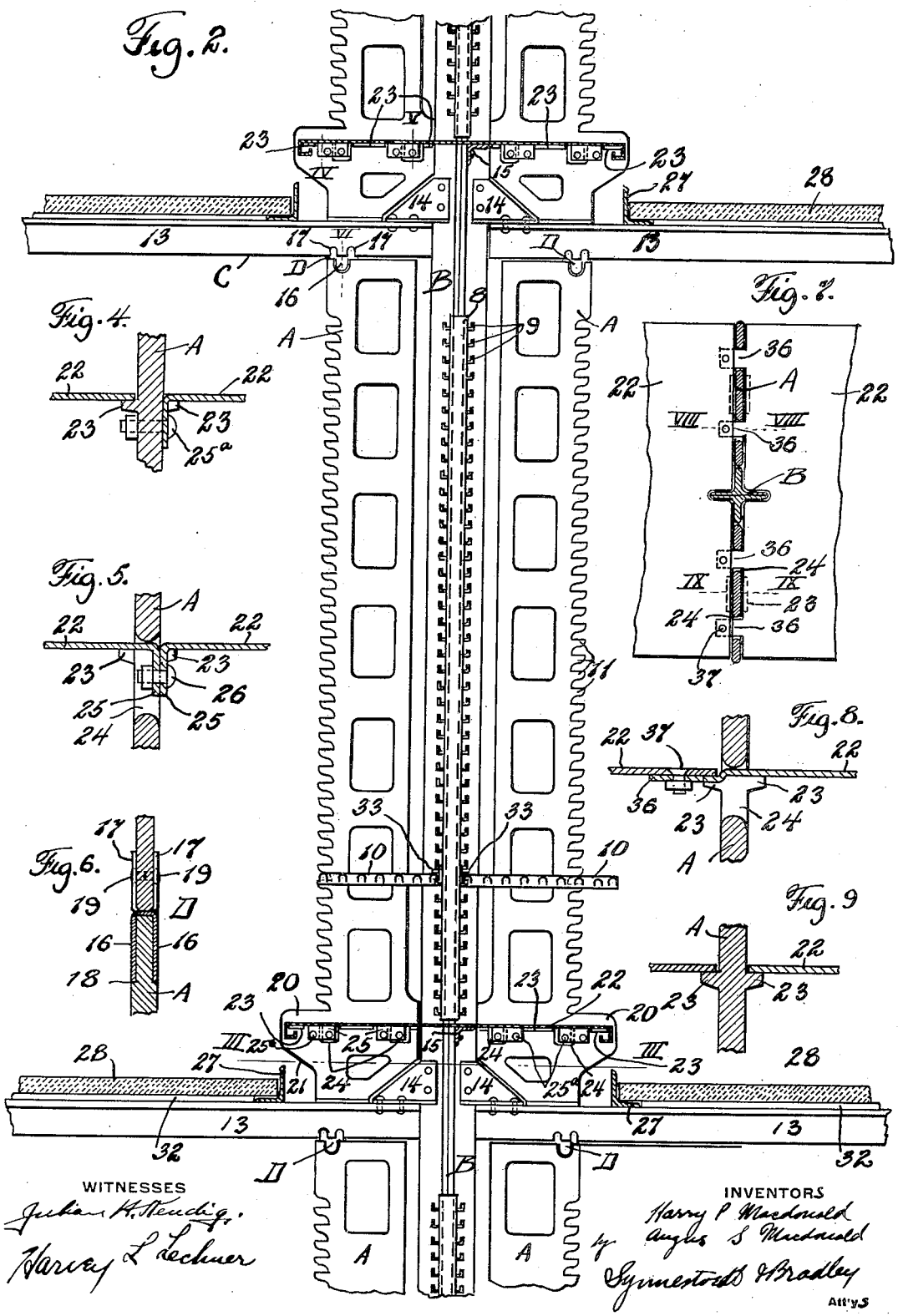

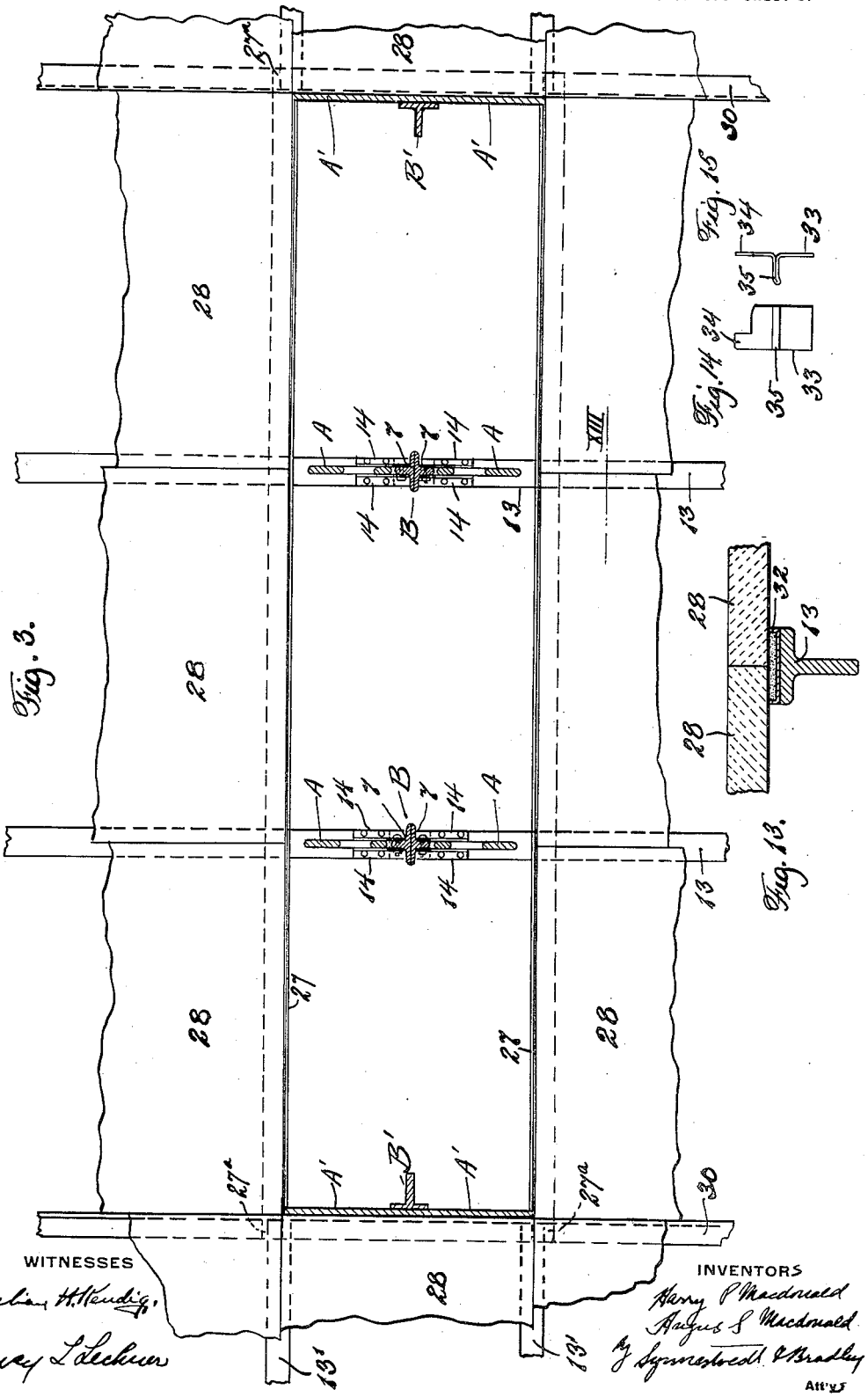

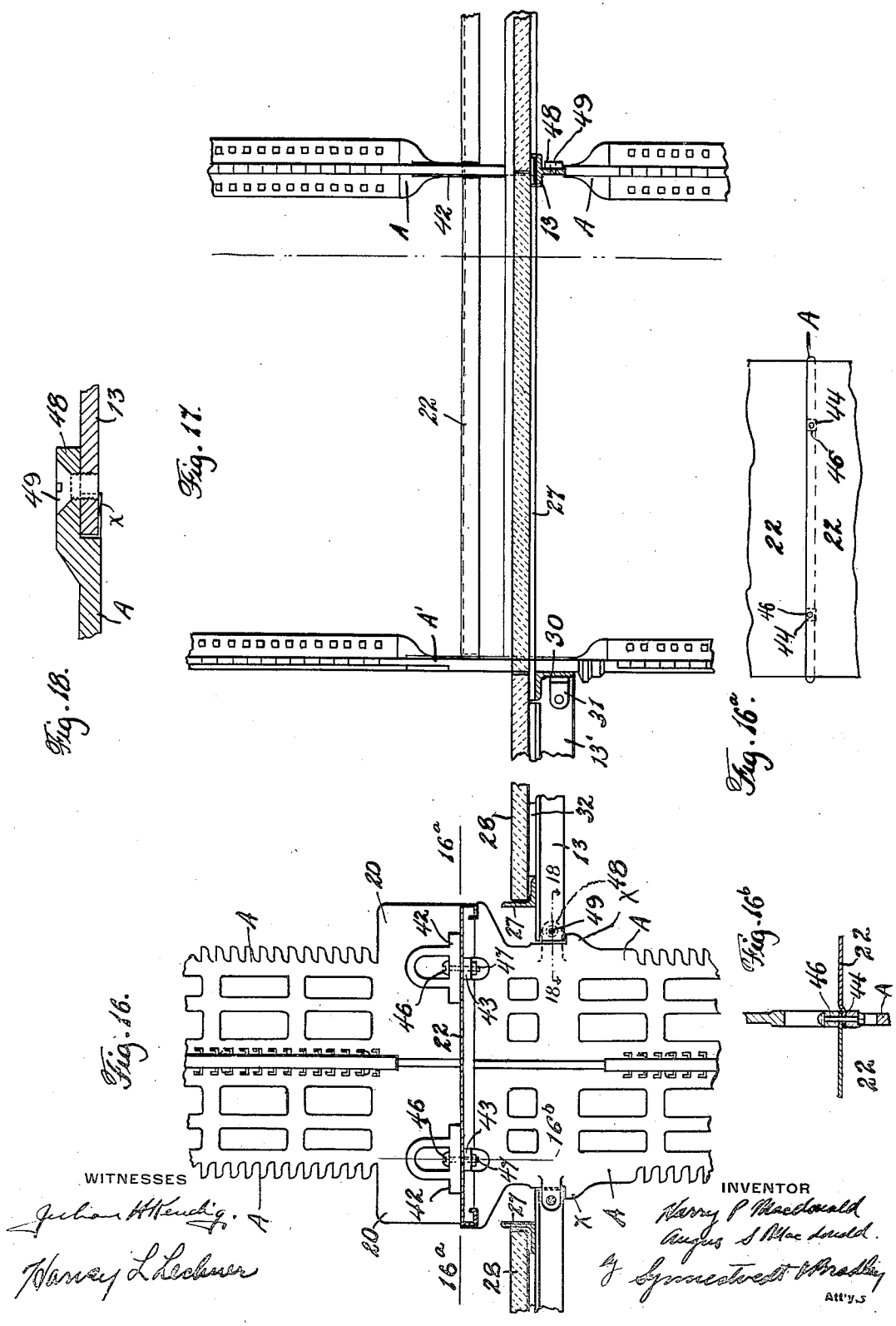

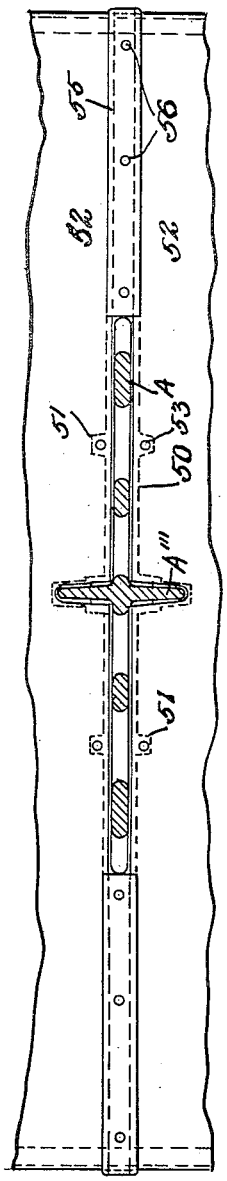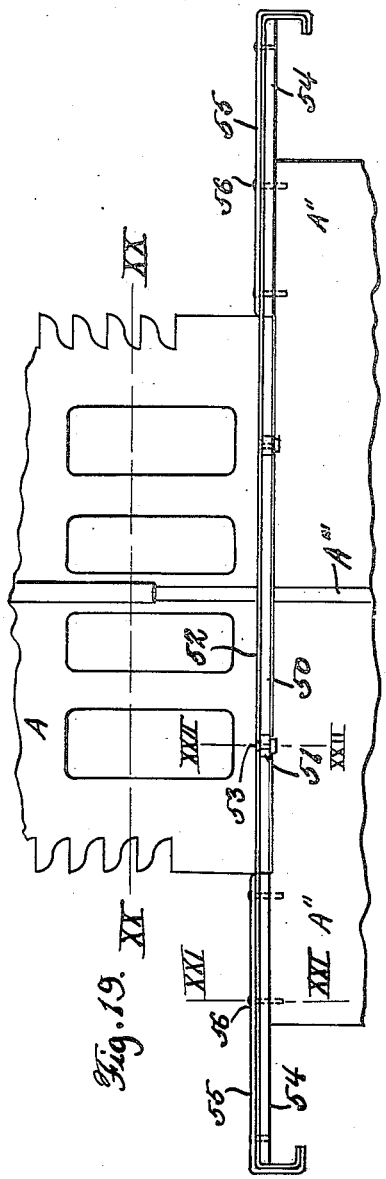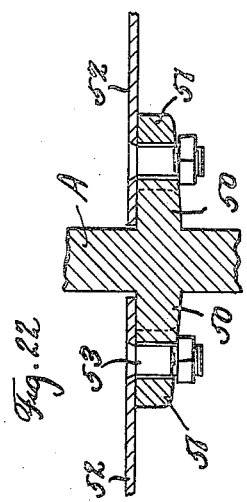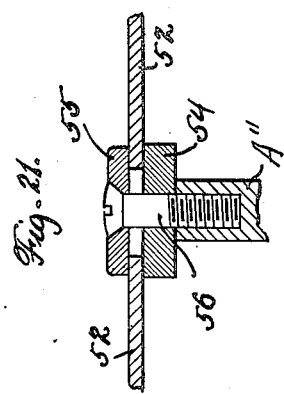

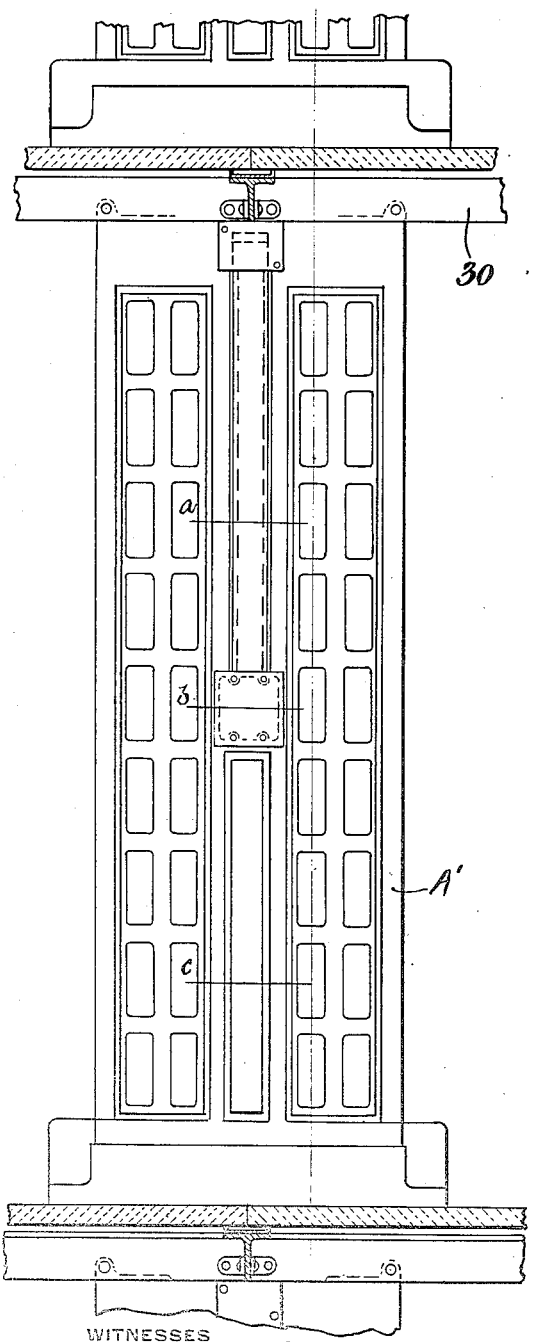
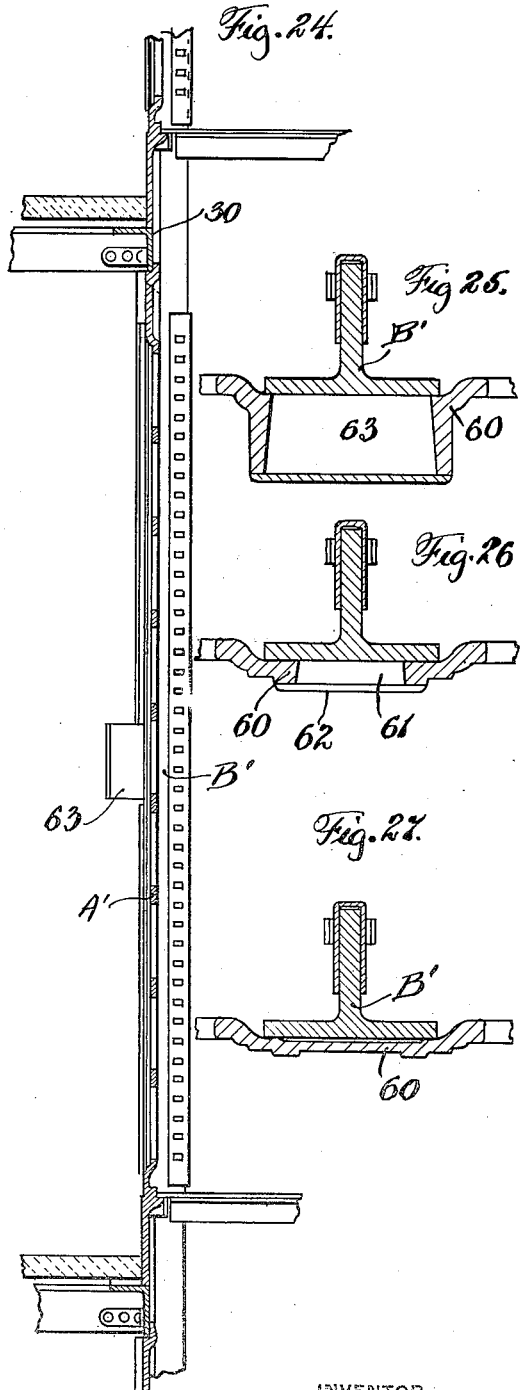

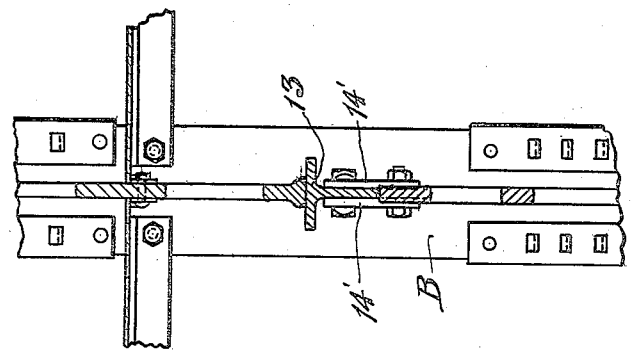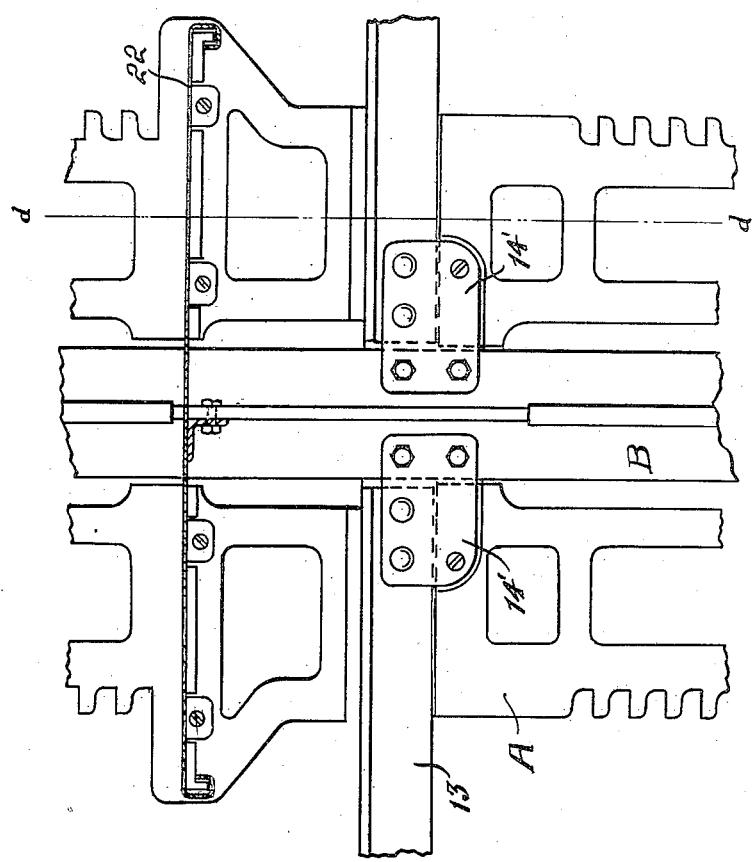

UNITED STATES PATENT OFFICE.

HARRY P. MACDONALD, OF MONTCLAIR, NEW JERSEY, AND ANGUS S. MACDONALD, OF NEW YORK, N. Y., ASSIGNORS TO THE SNEAD & CO. IRON WORKS, OF JERSEY CITY, NEW JERSEY, A CORPORATION OF NEW JERSEY.

BOOK-STACK.

1,251,072.          Specification of Letters Patent.          Patented Dec. 25, 1917.

Application filed April 28, 1913. Serial No. 763,984.

*To all whom it may concern:*

Be it known that we, HARRY P. MACDONALD and ANGUS S. MACDONALD, citizens of the United States, residing at Montclair, in the county of Essex and State of New Jersey, and at New York, in the county of New York and State of New York, respectively, have invented certain new and useful Improvements in Book-Stacks, of which the following is a specification.

This invention relates to book stacks and has reference in general to the provision of an improved arrangement of book stack which is simple in construction, easy to assemble, and in which the weight of the parts is reduced to a minimum. Our invention also contemplates the provision of an improved arrangement of the parts whereby effective ventilation is secured; the provision of improved shelf supporting means and the provision of improved means whereby the shelf supports are securely and rigidly bound together. Another object of the invention relates to the provision of means whereby shelves of different depths may be supported and locked in the shelf supports. The more specific objects of our invention will appear in the description of the various figures of the drawings which form a part of this specification.

The above together with such other objects as may hereinafter appear, or are incident to our invention, we attain by means of a construction, various embodiments of which are illustrated in the accompanying drawings wherein—

Fig. 1 is a front elevation of the end two shelf supports of a stack range, illustrating the general arrangement of supporting structural work and showing the deck floors between ranges in cross section; Fig. 2 is a section taken on the line II—II of Fig. 1 looking in the direction of the arrow; Fig. 3 is a horizontal section on the line III—III of Fig. 2; Figs. 4 and 5 are sections taken on the lines IV and V of Fig. 2 and illustrate details of the means for fastening the fixed bottom shelves extending between the upright shelf supports; Fig. 6 is a section taken on the line VI of Fig. 2 and illustrates the manner in which the tops of the shelf supports are secured to the deck floor structure; Fig. 7 is a sectional view showing a modified arrangement of securing adjacent fixed bottom shelves to one another, and Figs. 8 and 9 are sectional views respectively taken on the lines VIII—VIII and IX—IX of Fig. 7; Fig. 10 is a sectional view showing still another form of securing adjacent bottom shelves together, and Figs. 11 and 12 are sections taken respectively on the lines XI—XI and XII—XII of Fig. 10; Fig. 13 is a section taken on the line XIII of Fig. 3 and shows the means of supporting the deck floor plates on the deck floor structure; Figs. 14 and 15 are respectively front and side elevations of a locking clip employed in locking the shelves in position in the shelf supports; Fig. 16 is a transverse section through a stack in which the shelf supports are built up one upon another and the use of structural work dispensed with; Fig. 17 is a side elevation of Fig. 16, and Fig. 18 is a sectional view taken on the line 18—18 of Fig. 16 illustrating the manner in which the deck floor structural work is secured to the shelf supports; Fig. 19 is a side elevation of a stack which is substantially the same in general construction as that shown in Fig. 16 but which is provided with an extended bottom ledge; Fig. 20 is a section taken on the line XX—XX of Fig. 19; Fig. 21 is a section taken on the line XXI—XXI of Fig. 19; Fig. 22 is a section taken on the line XXII—XXII of Fig. 19; Fig. 16$^a$ is a section taken on the line 16$^a$—16$^a$ of Fig. 16; Fig. 16$^b$ is a section taken on the line 16$^b$ of Fig. 16; Fig. 23 is an end elevation of a range showing the arrangement whereby accommodation for the wiring of the stacks is provided; Fig. 24 is a vertical section taken on the line XXIV—XXIV of Fig. 23; Figs. 25, 26, and 27 are enlarged sections taken on the lines $a$, $b$, and $c$ respectively of Fig. 23; Fig. 28 is a sectional view illustrating a means for fastening the columns, shelf supports, and T-bars together, different from that shown in Fig. 2; and Fig. 29 is a section taken on the line $d$ of Fig. 28.

Referring now particularly to Figs. 1, 2, and 3, it will be seen that the stack comprises a plurality of vertical uprights or shelf supports A which are secured to vertical structural columns B and to the horizontal deck floor structure C, the range being built up in tiers as is customary. The columns B are composed of two T-bars 7—7 which are placed back to back and secured together by means of the U-shaped strips or clips 8 which embrace the flanges of the T-bars and extend substantially from deck floor to deck floor, the said U-clips being provided with punched out horns 9, which are adapted to support the shelves 10 in a manner which will hereinafter appear. The front edges of the shelf supports are provided with teeth 11 which are adapted to support the shelves 10 at the front portions thereof. The shelves 10 are preferably of the grid-iron type, the transverse bars being of an inverted U-shape whereby the innermost bar can be hooked over the horns 9. At the front shelves 10 are provided with lugs 12 which are adapted to engage the teeth 11 of the shelf supports.

It will be noted that the columns B extend up through the range and that the deck floor structures or horizontal supporting structure C are secured thereto between the tiers of shelf supports. The deck floor structure comprises the bars 13 which are preferably of a T-shape and extend between the ranges substantially from column to column with the base end up and the vehicle leg in substantial alinement with the flanges of the T-rails which form the columns B. This is shown in Figs. 1, 2, and 13. The deck bars or rails 13 are secured to the columns by means of the angle plates 14 which are arranged in pairs, one on each side of the column, and bolted to the column and to the base of the deck bar. By this construction it will be seen that the columns and the deck bars are secured together in alinement so that the side stresses will cause no distortion either of the columns or of the deck bars, this being an important feature of the invention. Also the connections between the columns and floor bars do not interfere with the book storage space. Longitudinally of the range the columns are secured together by means of the angle irons 15 (see Fig. 2) which extend between the columns and are riveted or bolted thereto. This construction is simple and lends rigidity to the entire stack.

The shelf supports A rest on the deck bars at the bottom and at the top are secured to the deck bars of the next tier by means of the clips D, said clips having pairs of lugs 16—16 and 17—17 which extend in reverse directions. The uprights A are provided at their front edges with undercut seats 18 which are adapted to receive the lugs 16 which thereby lie substantially flush with the sides of the uprights and hold the uprights against movement away from the columns B. The lugs 17 of the clips D embrace the vertical leg of the deck bars 13 and are secured thereto by means of the countersunk tap screws 19. By this construction the shelf supports are held in vertical alinement and the clips D are sunk sufficiently in the shelf support A to lie without the book space of the shelves. The arrangement is simple and the parts are easily assembled while the floor or deck bars do not extend into the book space on either side of the shelf supports and the entire space from the bottom shelf of a tier to the top of the shelf supports can be utilized for storing purposes. The floor or deck bars extend only between column and column. It will also be apparent that the floor bars can be conveniently handled thus facilitating the assembling of the stack. Another advantage resides in the fact that the deck bars and the intermediate shelf supports are in alinement whereby a uniform size of slabs for the deck floor can be used thereby improving the appearance of the floor.

The shelf supports A are widened out at the bottom, the projecting portions 20 being undercut as at 21 for a purpose which will hereinafter appear. The shelf supports of a stack are secured together adjacent the bottom portions thereof by means of a fixed shelf which extends substantially across the entire stack, which, in the construction illustrated in Figs. 1, 2, and 3, is of the double faced type. The shelf supports are provided on each side with lugs 23—23 etc. which support the fixed bottom shelves 22, and are also provided with apertures 24 which are located between the lugs. The shelves 22 are provided with downwardly projecting ears 25 which are so arranged as to register with the apertures 24 whereby they may be brought into engagement with one another and fastened by means of the bolts 26. The bottom shelves extending between adjacent shelf supports are therefore bound together and serve to hold the bottom of the shelf supports against displacement. It will also be noted that at one end of a shelf, the ears or lugs 25 are of greater width than at the other end, and overlap the apertures 24. Bolts 25$^a$ pass through such widened ears and secure the shelves to the shelf uprights. The construction will be clear on inspection of Fig. 2 and the sectional views shown in Figs. 4 and 5. The ends of the shelves 22 are bent over so as to hide the lugs 23 and present a neat appearance. It will be clear that by this construction the shelf supports A are securely and rigidly held against displacement or distortion. The widening of the shelf supports besides affording increased book space also has an additional function with respect to ventilation which will now be set forth.

Extending longitudinally of the ranges and mounted on the deck bars 13 in substantial alinement with the vertical edges of the widened ledge portions of the shelf supports, are the curb angles 27 which are adapted to support the ends of the deck slabs 28 composed of glass or some other suitable material.

The deck slabs extend substantially from center to center of the deck bars and from curb angle to curb angle adjacent the ranges thus providing a complete flooring for each tier but leaving a ventilation space extending substantially between the curb angles whereby circulation between successive tiers is established. The fixed bottom shelves cover or protect these ventilation spaces and the overhanging portions or ledges of the shelf supports and of the fixed bottom shelves project over the ventilation spaces substantially to the vertical leg of the curb angles and thus prevent any books or other articles from falling down through the tiers. The construction is also such that injury to the users is prevented. Another advantage of this arrangement resides in the fact that while the ventilation spaces are adequately protected the aisle space is not encroached upon in such manner as to in any way discommode those using the books. At the same time the books themselves are protected from injury caused by persons, book trucks, or other objects moving past the shelving. This construction also simplifies and cheapens the structure of the stacks in another respect which will now be pointed out.

From inspection of Fig. 3, which illustrates an entire range, it will be clear that the end shelf supports A' of the range therein shown are solid and are of a width at the bottom substantially the distance between the intermediate shelf supports at their widest point. The curb angles 27 extending the length of the range abut the edges of the shelf supports A'. Heretofore in order to close the ventilation spaces at the ends of a range it was necessary to bend the curb angle inward to meet the edges of the end shelf supports of a range. By widening out the shelf supports, in addition to the other advantages obtained, this bending of the curb angles is eliminated.

From inspection of Figs. 1 and 3 it will be seen that the vertical columns B' at the ends of a range are composed of single T-bars which are bound together from range to range by means of the angles 30 which extend transversely of the ranges. Extending from the angles 30 at the ends of adjacent ranges are deck bars 13' which are secured to the angles 30 by means of the clips 31 and which serve to support the floor slabs of cross aisles. The ends of the angles 27 have projecting ears or lugs 27ª which are adapted to rest upon the top of the angles 30, see Fig. 1. This affords a simple and convenient way of supporting the ends of the curb angles and at the same time rigidly binds the structure of adjacent ranges together.

Referring now particularly to Fig. 13 it will be seen that the deck slabs 28 are supported on the deck bars 13 through the medium of a filler 32 which extends along the tops of the deck bars between the aisles. This filler comprises a sheet metal plate bent up at the sides so as to constitute in effect a channel which is filled with cement or other plastic material. The advantages of this construction are that it lightens the weight of the filler considerably and reduces the cost of the device. In addition the thin fillers can be more readily fastened to the floor bars or welded thereto. If bolts or rivets are used countersunk heads therefor are not required, which also effects a saving in labor and expense. The trough shape of the fillers forms a good key for holding in the cement bedding for the floor slabs.

Directing attention again to the shelving 10 it will be noted that the shelves are locked in engagement with the horns 9 at their inner ends by means of a locking clip 33 which is illustrated in Figs. 14 and 15. The locking clips are provided at the top with lugs 34 which are adapted to extend past the horn immediately above and against which the upper edge of the clips is adapted to abut. The clips are made of sheet metal and are re-bent in the central portion thereof to provide a lip 35 which projects over the innermost cross bar of the shelf. By this construction the shelves are locked in position and can not swing upwardly from off the horns. The clips are held in place by means of the lugs 34. We are thus enabled to use shelves of varying widths in the same general construction without liability of the shelves becoming displaced. It will also be seen that by this construction the shelf supports can be made of uniform width and will nevertheless accommodate shelves of different sizes and that the books of various sizes may be shelved together as required by their classification without the necessity of providing maximum width shelves throughout the entire stack. This arrangement is of particular advantage in connection with a stack having ledge bottom shelves. In this form a wide shelf can be used without encroaching on the walking space of the aisles.

Referring now to Fig. 7 it will be seen that the bottom shelves 22 closely embrace the central columns and are thereby held against lateral displacement. While the construction of Fig. 7 is a modification of our invention, yet in the respect mentioned the construction is the same as that previously described. This form of supporting the shelves is also advantageous inasmuch as the use of supplemental holding means such for example as tap screws and bolts together with the drilling of holes in the shelf supports is dispensed with. The apertures 24 in the shelf supports which are required for the fastening together of adjacent bottom shelves are cast. By fastening the shelves 22 together in the position shown in Figs. 2, 4, and 5, they are prevented from springing up or becoming otherwise distorted. Referring now to those features of the device of Fig. 7, which are modifications of the invention, it will be seen that each bottom shelf is provided along one edge with a plurality of lugs 36 which are adapted to project through the apertures 24 in the shelf supports A and adapted to support the end of the adjacent bottom shelf which is fastened to said lugs by means of countersunk bolts 37 (see Fig. 8). As in the construction previously described the shelf supports are provided with a plurality of lugs 23 which support the bottom shelves (see Fig. 9).

In Fig. 10, we have illustrated still another manner of fastening the fixed bottom shelves together. In this form, the shelves are provided at each end with downwardly projecting lugs 38, which are bolted to the shelf supports by the screws 39 and nuts 40, the apertures 41 for receiving the screws being cast into the shelf supports. This provides a simple, inexpensive but secure means for binding the shelves together. Screw heads on the book supporting surfaces are also done away with.

Attention is now directed to Figs. 16, 17, and 18 wherein we have illustrated a stack in which the use of the vertical supporting structure is dispensed with. In this form of stack, the double faced upright shelf supports A are imposed upon one another in tiers, and are provided with lugs 42 and 43 which are so disposed as to aline when the shelf supports are superimposed. The fixed bottom shelves which are interposed between the tiers of shelf supports in the manner illustrated in Fig. 16ª are provided at one end with lugs 44 underlapping the adjacent bottom shelf. The shelf supports and bottom shelves are tied together by the screws 46 which pass through the lugs 42, 44, and 43 and shelves 22, and by the nuts 47. This serves to securely and rigidly fasten the parts together and holds the shelf supports against twisting or lateral displacement. It will be obvious that any of the other forms of fastening the fixed bottom shelves could be employed. The arrangement is simple and the parts are easily assembled, while the floor bars do not extend into the book space and the entire space from bottom shelf to bottom shelf of the tiers can be utilized for storing purposes. The floor bars extend only from shelf support to shelf support whereby a considerable saving in materials is effected.

The ranges are bound together by the deck bars 13 which are fastened to the shelf supports and support the floor slabs of the aisles. Adjacent the top the shelf supports are provided at each vertical edge with an offset apertured lug 48 and the vertical legs of the deck bars rest on projections X on the shelf supports and are fastened to the lugs by means of the tap screws 49 or bolts (see Fig. 18). The ranges are thus bound laterally into a rigid structure. In this construction the ventilation spaces are covered as before but the shelf supports are also provided with ledges at the top to register with the widened or ledge portions of the bottom of the superimposed shelf supports.

Attention is now directed to Figs. 19 to 22 wherein we have illustrated an improved form of ledge shelf stack. In this type the shelf supports A are double faced and are provided with a wide ledge A″ on each side. The shelf supports are provided with flanges 50 located in the plane of the top of the ledges A″ and the flanges have apertured lugs 51. The fixed ledge shelves 52 extend between adjacent shelf supports and are fastened to the lugs 51 by bolts 52, the flanges 50 serving to support the shelves. The overhanging portions of the shelves are carried on the bars 54 and the plate 55 which serves to cover up the adjacent edges of the shelves. The screws 56 securely bind the plates 55, bars 54, and shelves to the shelf supports. The shelves are cut away to freely slip over the vertical stiffening ribs A‴ of the shelf supports and the flanges 50 are carried around said stiffening ribs to support the edges of the cutaway portions of the shelves.

The chief advantage of this construction resides in the fact that the ledge shelves can be placed in position after the rest of the case has been erected. The parts are easily assembled and are strong and economical. The joints between ledge shelves are entirely covered and the ledge shelves may also be secured to shelf supports in any of the various ways described for the bottom fixed shelves.

Referring now to Figs. 23 to 27 inclusive, it will be seen that in said figures we have illustrated in detailed form the construction of the end supports of a range. The shelf supports A′ are single panels of the double faced type, secured at the top to the angles 30. Adjacent the central portion of a shelf support and extending substantially from the top to the bottom thereof is an offset portion or panel 60 adapted to receive the base of the vertical column B′. Extending from the top of the panel 60 to a point substantially midway of the ends thereof, is a slot or groove 61, which in conjunction with the column B′ forms a shallow trough or conduit for the wires of the lighting system, such conduit being closed by a removable cover plate 62. The conduit terminates at the bottom in a junction box 63. This construction provides a simple and convenient means for accommodating the wires, lends attractiveness to the appearance of the stacks, and is inexpensive since the parts with the exception of the cover plate, can be cast integral with the panels.

In Figs. 28 and 29 we have illustrated an additional means for fastening the shelf supports, vertical columns, and floor bars together, the construction resembling in general features that shown in Fig. 2. As before shown, plates 14' bind together the columns, the floor bars, and the tops of the shelf supports, the plates overlapping such parts on opposite sides and being bolted or riveted in place. At the bottom, the shelf supports are bound together and braced by the shelves 22. This construction is simple and rigid and obviates the use of supplementary holding means for the upper portions of the shelf supports.

What we claim is:

1. A book stack structure comprising in combination a plurality of ranges spaced apart to provide longitudinal aisles, vertical shelf supports in said ranges, deck bars extending between the shelf supports and across the aisles, each deck bar having its ends secured to the edges of the shelf supports, and flooring on the deck bars.

2. A book stack range comprising in combination a plurality of upright members having vertical stiffening ribs, upright shelf supports adjacent to said members, shelves extending between the upright members longitudinally of the range and embracing said ribs, and means for fastening the adjacent shelves together with the shelf supports between.

3. A book stack comprising in combination a plurality of upright supporting columns, a plurality of horizontally extending supporting members carried by said columns and arranged in tiers, a plurality of upright shelf supports detachably secured at the top to the horizontal supporting members and resting upon the next lower tier of supporting members, and detachable horizontally extending spacing plates between the shelf supports adjacent the bottoms thereof.

4. A book stack comprising in combination, a plurality of vertical columns, a plurality of horizontal supporting members carried by the columns and arranged in tiers, a plurality of vertical shelf supports consisting of plates resting on the supporting members of one tier, means for securing the shelf supports adjacent the top, a plurality of spacing plates extending horizontally between the shelf supports adjacent the bottom thereof and adapted to hold the shelf supports in position, and means for securing the plates together.

5. A book stack comprising in combination a plurality of vertical columns, a plurality of horizontal supporting members carried by the columns and arranged in tiers, a plurality of vertical shelf supports consisting of plates resting on the supporting members of one tier, means for securing the shelf supports adjacent the top, a plurality of spacing plates extending horizontally between the shelf supports adjacent the bottom thereof and adapted to hold the shelf supports in position, and means for detachably securing the plates together.

6. A book stack comprising in combination a plurality of vertical columns, a plurality of horizontal supporting members carried by the columns and arranged in tiers, a plurality of vertical shelf supports resting on the supporting members of one tier, means for securing the shelf supports adjacent the top, a plurality of bottom shelves extending between the shelf supports and adapted to serve as spacing members, and means for securing the bottom shelves together.

7. A book stack comprising in combination a plurality of vertical columns, a plurality of horizontal supporting members carried by the columns and arranged in tiers, a plurality of vertical shelf supports resting on the supporting members of one tier, means for securing the shelf supports adjacent the top, a plurality of bottom shelves extending between the shelf supports and adapted to serve as spacing members, apertures in the shelf supports, lugs on the bottom shelves adapted to aline with said apertures, and means for securing the lugs together.

8. A book stack comprising in combination a plurality of vertical columns, a plurality of horizontal supporting members carried by the columns and arranged in tiers, a plurality of vertical shelf supports resting on the supporting members of one tier, means for securing the shelf supports adjacent the top, a plurality of bottom shelves extending between the shelf supports and adapted to serve as spacing members, an aperture in the shelf supports, lugs on the bottom shelves, corresponding lugs being adapted to aline with the aperture, and means for fastening the lugs together.

9. A book stack comprising in combination a plurality of vertical columns, a plurality of horizontal supporting members, a plurality of upright shelf supports resting on the supporting members, means for securing the shelf supports adjacent the top, bottom shelves extending between the shelf supports and adapted to serve as spacing members, an aperture in each shelf support, and a lug on each bottom shelf adapted to project through said aperture and adapted to be secured to the adjacent bottom shelf.

10. A book stack comprising in combination a plurality of ranges spaced apart to provide longitudinal aisles, vertical shelf supports in said ranges having a lug projecting from the vertical edges thereof, deck bars extending between the vertical edges of the shelf supports and across the aisles, and means for fastening the ends of the deck bars to the lugs on the shelf supports.

11. A double faced book stack comprising in combination a pair of upright columns, a pair of shelf supports for each column arranged on opposite sides thereof, and a shelf extending across a pair of the shelf supports, said shelf holding the shelf supports against movement away from the columns.

12. A double faced book stack comprising in combination a pair of upright columns, a pair of shelf supports for each column arranged on opposite sides thereof, and a shelf extending across a pair of the shelf supports, said shelf holding the shelf supports against movement away from the columns, and means whereby said shelf holds the shelf supports against lateral displacement.

13. A double faced book stack comprising in combination a pair of upright columns, a pair of shelf supports for each column arranged on opposite sides thereof, and a shelf extending across a pair of the shelf supports, said shelf holding the shelf supports against movement away from the columns, and also embracing the columns.

14. A double faced book stack comprising in combination a pair of vertical supporting members, a pair of shelf supports for each member arranged on opposite sides of said members, a shelf extending between the pairs of shelf supports, and a lug on each of the shelf supports engaged by the shelf whereby the shelf supports are held against movement apart.

15. A double faced book stack comprising in combination a pair of vertical supporting members, a pair of shelf supports for each member arranged on opposite sides of said members, a shelf extending between the pairs of shelf supports, and a lug on each of the shelf supports engaged by the shelf whereby the shelf supports are held against movement apart, said shelf embracing the upright supporting members.

16. A double faced book stack comprising in combination a plurality of vertical supporting members, a pair of shelf supports for each of said members arranged on opposite sides thereof, a shelf extending between adjacent pairs of shelf supports, means whereby said shelves prevent the pairs of shelf supports from moving apart transverse the stack, and means for securing the adjacent shelves together whereby the shelf supports are held against relative lateral displacement.

17. A book stack comprising in combination a plurality of ranges arranged in tiers and each having vertical shelf supports, flooring arranged adjacent the ranges, ventilation spaces along the ranges at each tier, and spacing plates extending horizontally over said spaces to substantially cover said spaces but permitting free circulation, said spacing members being located adjacent to the bottom portions of the shelf supports and serving to position the shelf supports.

18. A book stack comprising in combination a range, flooring adjacent thereto, a ventilation space along the range, and a shelf adjacent the bottom of the range extending substantially over said space to cover said space but permitting free circulation.

19. A book stack comprising in combination a range, flooring adjacent thereto, a ventilation space along the range, and a plate extending horizontally to cover over said space and spaced away therefrom to permit circulation and extending substantially the length of the range.

20. A book stack comprising in combination a range having shelf supports provided with widened bases, a floor structure adjacent the range, a curb angle carried on said structure and adapted to abut the edges of the widened portions of the shelf supports and providing a ventilation space extending longitudinally with the range, and a shelf carried by said widened portions and projecting horizontally over the ventilation space.

21. A book stack comprising in combination a pair of ranges having shelf supports provided with ledges adjacent the bottom, floor supporting structure between the ranges, a curb angle carried in said structure extending along each range and abutting the ledges of the shelf supports, flooring carried by the curb angles, and shelves carried by said ledge portions of the shelf supports and extending approximately to the curb angles but spaced apart therefrom to provide ventilation spaces extending longitudinally with the ranges.

22. A framework for bookstacks comprising in combination a plurality of upright columns, a plurality of horizontal bars extending between the columns and lying in the same vertical planes, pairs of plates on the bars adapted to embrace the columns on opposite sides, and means for securing the plates in position on the columns.

In testimony whereof we have hereunto signed our names in the presence of the two subscribed witnesses.

HARRY P. MACDONALD.
ANGUS S. MACDONALD.

Witnesses:
HELEN V. FALLON,
GEO. B. MACMAHON.